ized from HClO₄ and CF₃SO₃H. The polysilazane is
United States Patent [19]

Lebrun et al.

[11] Patent Number: 4,689,382

[45] Date of Patent: Aug. 25, 1987

[54] PROCESS FOR THE PREPARATION OF ORGANOPOLYSILAZANES AND OF ORGANOPOLY(DISILYL)SILAZANES WITH IMPROVED THERMAL BEHAVIOR AND USE OF SUCH SILAZANES AS CERAMIC PRECURSORS

[75] Inventors: Jean-Jacques Lebrun, Caluire; Hugues Porte, Lyons, both of France

[73] Assignee: Rhone-Poulenc Specialites Chimiques, Courbevoie, France

[21] Appl. No.: 832,394

[22] Filed: Feb. 24, 1986

[30] Foreign Application Priority Data

Feb. 27, 1985 [FR] France ................. 85 02805

[51] Int. Cl.⁴ .................................. C08G 77/06
[52] U.S. Cl. ............................ 528/12; 528/23; 528/28; 528/32; 525/474; 501/92; 501/154
[58] Field of Search ............... 528/12, 23, 28, 32; 525/474; 501/92, 154

[56] References Cited

U.S. PATENT DOCUMENTS

| | | | |
|---|---|---|---|
| 3,892,583 | 7/1975 | Winter et al. | 501/92 |
| 4,097,294 | 6/1978 | Rice et al. | 501/92 |
| 4,314,956 | 2/1982 | Baney et al. | 528/28 |
| 4,340,619 | 7/1982 | Gaul, Jr. | 528/38 |
| 4,395,460 | 7/1983 | Gaul | 501/92 |
| 4,404,153 | 9/1983 | Gaul, Jr. | 501/92 |
| 4,482,669 | 11/1984 | Seyferth et al. | 528/28 |

*Primary Examiner*—Melvyn I. Marquis
*Attorney, Agent, or Firm*—Finnegan, Henderson, Farabow Garrett & Dunner

[57] ABSTRACT

The present invention relates to a process for the treatment of polysilazane in a homogeneous phase with a catalytically effective quantity of an acid catalyst selected from $HClO_4$ and $CF_3SO_3H$. The polysilazane is preferably selected from the group consisting of organopolysilazane, organopoly(disilyl)silazane and mixtures thereof. The organic radicals bonded to the silicon atoms are preferably saturated or aromatic hydrocarbon radicals and the silicon atoms of the polysilazane are substantially free from any hydrogen atom bonded directly to the silicon atoms.

The polysilazanes treated in this manner have good thermal behavior and, are particularly useful as precursors of ceramic products.

22 Claims, No Drawings

PROCESS FOR THE PREPARATION OF ORGANOPOLYSILAZANES AND OF ORGANOPOLY(DISILYL)SILAZANES WITH IMPROVED THERMAL BEHAVIOR AND USE OF SUCH SILAZANES AS CERAMIC PRECURSORS

The present invention relates to a process for treating polysilazanes to provide organopolysilazanes, and particularly organopoly(disilyl)silazanes with improved thermal characteristics. Such silazanes may be used as precursors to produce products, particularly ceramic products, with enhanced characteristics.

Organopolysilazanes and organopoly(disilyl)silazanes are sometimes hereinafter referred to in this application as polysilazanes. Polysilazanes are well-known compounds which may be in the form of monomers, oligomers, cyclic or linear polymers or resinous polymers. These polysilazanes can be prepared in accordance with a wide variety of processes known to those of ordinary skill in the art from a wide range of starting materials.

Polysilazanes possess many advantageous uses. Polysilazanes can be shaped and pyrolysed in the form of $Si_3N_4$, SiC or their mixtures. Polysilazanes can be spun into continuous fibers, the pyrolysis of which yields ceramic fibers. Polysilazanes can be formed into films of various thicknesses, formed into massive components cast as a binder for ceramic fiber or carbon fiber, and may also be used as a sintering binder for porous ceramic components.

Polysilazanes usually contain a proportion of low molecular weight species which are evaporated during pyrolysis thereby reducing the weight yield of ceramic product relative to the starting material. In addition, many polysilazanes are not heat-stable during pyrolysis. Bonds between silicon atoms and nitrogen atoms are broken during pyrolysis causing some polysilazane to decompose into volatile oligomers. This further reduces the weight yield of ceramic product based on the weight of the starting polysilazane. Polysilazanes are also subject to attack by oxygen and atmospheric moisture.

One solution proposed to help increase the weight yield of ceramic product relative to the weight of polysilazane appears in Japanese Patent Application Kokai No. 77/160,446 which describes a process for polymerizing organopolysilazanes of high molecular weight by using acidic earth metals as a catalyst. Disadvantageously, however, the solid catalyst has to be separated from the treated polysilazane. Filtration involving the use of a solvent is needed when polymers of high viscosities are involved.

An object of the present invention therefore is to provide a polysilazane which is relatively stable to hydrolysis and which produces a ceramic material in a high yield relative to the weight of the precursor polysilazane after the polysilazane has been pyrolysed. To do this, the polysilazane, when pyrolysed, must have a heat resistance which can be contributed to by a high molecular weight and/or a high viscosity ranging up to the solid state. The present invention can fulfill this objective without disadvantageously using heterogeneous catalysis.

The present invention is a process for treating polysilazane characterized by treating at least one polysilazane in a homogeneous phase with a catalytically effective amount of an acid catalyst selected from the group consisting of $HClO_4$ and $CF_3SO_3H$. Preferably, the treatment is conducted for a time sufficient to polymerize and/or copolymerize and/or rearrange the polysilzanes. Polysilazanes used in this invention are preferably selected from organopolysilazanes, organopoly(disilyl)silazane and mixtures of organopolysilazane and organopoly(disilyl)silazane, in which the organic radicals bonded to the silicon atoms are saturated or aromatic hydrocarbon radicals. The polysilazane is preferably substantially free from hydrogen atoms bonded directly to the silicon atoms.

The organopolysilazane used in the present invention may be produced by reaction of:

(a) at least one organohalosilane of the formula:

$$R_aX_{4-a}Si \qquad (I)$$

in which X is a halogen, perferably chlorine; a is 0, 1, 2 or 3; and the radicals R, which are identical or different from each other, are selected from the group consisting of an optionally halogenated linear or branched alkyl radical containing from 1 to 12 carbon atoms, a cycloalkyl radical containing from 5 to 7 carbon atoms and an aryl radical such as the phenyl or naphthyl radical, an arylalkyl or alkylaryl radical in which the linear or branched alkyl portion contains from 1 to 6 carbon atoms; with (b) an organic or organosilyl compound containing at least one $NH_2$ or NH group. Illustrative (b) compounds include ammonia, primary or secondary amines, silylamines, amides, hydrazines, hydrazides, etc.

In formula (I), the following are more specific examples of radicals included within the definition of R: as alkyl radicals, methyl, ethyl, propyl, butyl, pentyl, hexyl, heptyl and octyl radicals; as cycloalkyl radicals, cyclopentyl, cyclohexyl and cycloheptyl radicals; as examples of arylalkyl radicals, benzyl and phenylethyl radicals; and as alkylaryl radicals, tolyl and xylyl radicals.

Specific organohalosilanes which can be used by themselves or mixed include the following:
$(CH_3)_2SiCl_2$, $(CH_3)_3SiCl$, $CH_3SiCl_3$, $SiCl_4$
$(CH_3)_2Si(CH_2Cl)_2$, $(CH_3)_3SiCH_2Cl$, $CH_3Si(CH_2Cl)_3$
$(C_6H_5)_2SiCl_2$, $(C_6H_5)(CH_3)SiCl_2$, $C_6H_5SiCl_3$ and
$(CH_3)(CH_3CH_2)SiCl_2$ The polysilazanes treated in accordance with the invention include those that are well-known and may readily be prepared by methods known to those of ordinary skill in the art. More specifically, the organo polysilazanes include:

(A) the linear polymers corresponding to the formulae:

$$H_2N(R_2SiNH)_pSiR_2NH_2 \qquad (II)$$

and

$$R_3SiNH(R_2SiNH)_{p'}SiR_3 \qquad (III)$$

in which R has the same meaning as in formula (I), and p and p' are integers ranging from 1 to about 1,000 and generally from 3 to 300.

The polymers of formula (II) can be prepared by bringing diorganochlorosilanes into contact with ammonia. Those of formula (III) can be prepared by the reaction of ammonia with a triorganochlorosilane (see French Patent FR-A. 1,086,932, and U.S. Pat. No. 2,564,674). As a general rule, the reaction of an organohalosilane with an organoamine is described in U.S. Pat. Nos. 3,853,567 and 3,892,583. The reaction of an organohalosilane with a disilazane is described in Belgian Patent BE-A. 888,787. The disclosures of U.S. Pat. Nos. 2,564,674, 3,853,567 and 3,892,583 are incorporated herein by reference;

(B) the cyclic polymers corresponding to the formula:

$$(R_2SiNH)_n \qquad (IV)$$

in which n is from 3 to 10, preferably n=3.4 and R has the same meaning as in formula I. These polymers are described in British Patent GB-A. 881,178;

(C) the resinous polymers generally consisting of units selected from the formulae $R_3SiNH_{0.5}$, $R_2SiNH$, $RSiNH_{1.5}$, and $Si(NH)_2$. These resinous polymers are advantageously prepared by bringing the corresponding organochlorosilanes or mixtures of such organochlorosilanes into contact with ammonia, preferably in an organic solvent medium as described in French Patents FR-A. 1,379,243, FR-A. 1,392,853 and FR-A. 1,393,728.

These resinous polymers contain predominantly Si-NH-Si bonds and a smaller number of $SiNH_2$ bonds. In addition to crosslinked polymers, the resinous polymers sometimes include linear and cyclic polymers, the cyclic polymers being capable of forming only when diorganodichlorosilanes are present among the starting organochlorosilanes.

Organopol(disilyl)silazanes treated in accordance with the present invention can be prepared by the reaction of:

(a) an organic or organosilyl compound containing at least one $NH_2$ or NH group, such as, for example, ammonia, primary or secondary amines, silylamines, amides, hydrazines and hydrazides with (b) at least one organohalodisilane of formula:

$$R_bX_{3-b}SiSiR_cX_{3-c} \qquad (V)$$

in which the radicals R, which are identical or different, have the same meaning as in formula (I), b is equal to 0, 1, 2 or 3, c is equal to 0, 1 or 2 and X is a halogen, preferably chlorine. The following are examples of compounds of formula (V):

$(CH_3)_2ClSiSi(CH_3)_2Cl$, $(CH_3)_2ClSiSiCH_3Cl_2$, and $CH_3Cl_2SiSiCH_3Cl_2$ The following compounds containing at least one $NH_2$ or NH group are examples of compounds which can be used for the synthesis of the above polysilazanes; ammonia, methylamine, dimethylamine, ethylamine, cyclopropylamine, hydrazine, methylhydrazine, ethylenediamine, tetramethylenediamine, hexamethylenediamine, aniline, methylaniline, diphenylamine, toluidine, guanidine, aminoguinidine, urea, hexamethyldisilazane, diphenyltetramethyldisilazane, tetraphenyldimethyldisilazane, tetramethyldivinyldisilazane, dimethyldiphenyldivinyldisilazane and tetramethyldisilazane.

The reaction of a halodisilane with ammonia, optionally in the presence of a halosilane, is described in European Patent EP-A. 75,826. The reaction of a halodisilane with a disilazane is described in French Patent FR-A. 2,497,812.

As described in Patent EP-A. 75,826, organopoly[(-disilyl)silazanes-silazanes], which can be treated in accordance with the present invention, can be prepared by the reaction of the above-mentioned amino derivatives with mixtures of halogenated products of formulae (I) and (V) above.

The polysilazanes used as starting materials in the present invention which are prepared from ammonia are generally referred to as ammonolysates and the starting polysilazanes prepared from an above-mentioned amino compound containing at least one $NH_2$ or NH group are referred to as aminolysates, which consequently include the ammonolysates.

In the following examples, the functionality f of the starting halosilanes or halodisilanes and the mean functionality $f^N$ of the starting aminolysates treated according to the process of the invention are defined as follows:

(1) In halosilanes, the functionality f is equal to the number of halogens bonded directly to the silicon, f ranging from 0 to 4:

Example: $(CH_3)_2SiCl_2$, f=2.

(2) In halodisilanes, the unit Si-Si is considered to be a specific entity, that is to say the functionality is equal to the number of halogens bonded directly to this entity and can vary from 0 to 6:

Example: $CH_3Cl_2SiSiCl_2CH_3$, f=4.

(3) In aminolysates, the concept of functionality is transposed by defining a functionality $f^N=1$ contributed by a Si-N bond.

Thus, in the aminolysates of the polysilazane type, the following units can be distinguished:

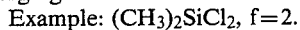

which is considered to be monofunctional;

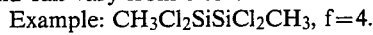

which is considered to be difunctional;

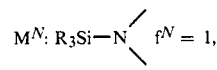

considered to be trifunctional; and

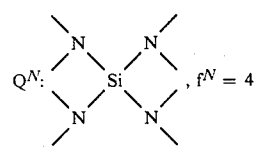

considered to be tetrafunctional.

In aminolysates of the poly(disilyl)silazane type, the functionality $f^N$ of the disilyl units is calculated as that of the halodisilanes by considering the nitrogen-containing substituents instead of halogen atoms.

The mean functionality $f_m^N$ of the aminolysates is calculated from the molar percentages of the various units of which the aminolysate consists, weighted by their specific functionality; thus, for n different units:

$$f_m^N = \frac{\sum_{i=1}^{i=n} (\text{molar \%})_i \times f_i}{100}$$

Example: In an aminolysate with $D^N=60$ mole % and $T^N=40$ mole %, $$f_m^N = \frac{60 \times 2 + 40 \times 3}{100} = 2.4$$

The starting aminolysates are usually in the form of a liquid of low or high viscosity, or even in the form of a paste, ranging up to the solid state.

The aminolysates usually contain a proportion, which may be high, of low-molecular mass species which can be vaporized during the pyrolysis and which can, as a result, proportionately reduce the weight yield of ceramic product relative to the starting material. In addition, these aminolysates, especially in the case where they include a high content of a difunctional silicon (for example $D^N$) are not sufficiently heat-stable during the pyrolysis. They decompose by breakage of the

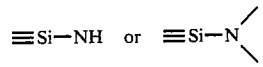

bonds to give rise to volatile oligomers, reducing proportionately the weight yield of ceramic product based on the starting material.

In a wholly unexpected manner, the process of the invention, which comprises a homogeneous acid catalysis treatment of polysilanes, incorporates the volatile species in the macromolecules of the aminolysate and, particularly in the presence of trifunctional silicon-containing units (for example $T^N$), rear-ranges and super-crosslinks and aminolysate network. As a result, the treated polysilazane is more stable thermally during pyrolysis. Depending on the nature of the starting aminolysate, the catalytic treatment of the invention thus gives rise to a polymerization and/or a copolymerization and/or a rearrangement of the molecules.

Another highly important advantage resulting from the acid treatment according to the invention is the production of a treated aminolysate which has improved resistance to oxygen and to atmospheric moisture.

It has been found that only two strong acids, $HClO_4$, and $CF_3SO_3H$, are suitable as the acid catalyst. Other strong acids such as HF, $H_2SO_4$ and $CCL_3COOH$ do not provide the desired results.

The catalyst is usually employed in concentrations ranging from about 1 ppm to 10,000 ppm of acid based on the starting polysilazane, and preferably from about 10 ppm to 5,000 ppm. The polymerization temperature preferably ranges from about 20° C. to 180° C., more preferably from 120° C. to 160° C.

The reaction can be carried out in bulk, which represents a clear advantage. However, an organic solvent such as toluene, methylene chloride, benzene, xylene, hexane, heptane, and the like can be used. The reaction can be carried out at atmospheric pressure, under pressure or under reduced pressure.

The reaction time is naturally a function of the catalyst concentration and of the reaction temperature. For a temperature ranging from about 120° to 160° C. and an acid concentration from about 10 to 5,000 ppm, the polymerization time is advantageously between about 30 minutes and 30 hours.

The process of the invention can be carried out using various polysilazanes employed by themselves or mixed for example with organopoly(disilyl)silazanes or organopolysilazanes of various kinds. Thus, it is possible to carry out:

a polymerization of the aminolysate of $(CH_3)_2SiCl_2$;

polymerization of the aminolysate of $(CH_3)_2ClSiSiCl(CH_3)_2$;

a copolymerization of the aminolysate of $(CH_3)_2SiCl_2$ and of the aminolysate of $CH_3SiCl_3$;

a rearrangement of a polydimethylsilazane in the presence of an aminolysate of $CH_3SiCl_3$;

a rearrangement of a coaminolysate of $(CH_3)_2SiCl_2$ and of $CH_3SiCl_3$;

a rearrangement of a coaminolysate of $(CH_3)_2SiCl_2$ and of $(CH_3)_{3-b}Cl_bSiSiCl_c(CH_3)_{3-c}$, wherein b and c are defined as in the formula (V) with, in addition, a mean functionality $f_m^N > 2$.

When the operation is complete, the reaction mixture is deactivated by any suitable means, for example by the addition of a basic compound such as $NH_3$ or $Et_3N$ to the reaction mixture.

In the following examples, which illustrate the invention without limiting its scope, the polysilazanes obtained, which are either treated catalytically or untreated, are analyzed by dynamic thermogravimetric analysis (TGA) by being pyrolysed from ambient temperature (20° C.) to 1,400° C. under nitrogen at a rate of temperature rise of 2° C./min. The TGA yield (weight % of solid residue at 1300°–1400° C.) is indicated in he examples. An empirical formula:

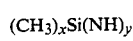

is calculated which is theoretically capable of giving, after pyrolysis, $\alpha(Si_3N_4) + \beta SiC$ if $y < 4/3$ $\alpha = 3y/4$ and $\beta = 1 - \alpha$ if $y \geq 4/3$ $\alpha = 1$ and $\beta = 0$.

Since halosilanes and polysilazanes are moisture-sensitive, all the handling is carried out in an inert atmosphere (dry $N_2$) to avoid the formation, due to hydrolysis, of a silazane bond, which is detrimental to the ceramic quality (silica formation during the pyrolysis).

The viscosity is measured at 25° C. and is given in mPas.

EXAMPLES 1–9

The material used is hexamethylcyclotisilazane $D_3^N$ ($D^N = -Si(CH_3)_2NH-$), obtained by the reaction of dimethyl-dichlorosilane $(CH_3)_2SiCl_2$ with $NH_3$.

When the product is purified by distillation, the fraction whose boiling point is 188° C. and whose melting point is $-10°$ C. is collected. It is dried over $CaCl_2$.

The apparatus employed is a 3 liter reactor equipped with mechanical stirring, a vertical condenser and a thermometer. The reactor is purged with dry nitrogen. The $D_3^N$ (4.2 moles), free from water, is introduced under $N_2$ and is heated to the required reaction temperature. The catalyst is then added with a syringe through a septum.

The reaction mixture is deactivated by the addition of ammonia or triethylamine at the required time.

The results are shown in Table I below.

TABLE I

| Ex. | Catalyst formula | Catalyst concentration (ppm) | Temperature °C. | Reaction time (hours) | RY* of polymer % |
|---|---|---|---|---|---|
| 1 | HF (40% in $H_2O$) | 600 | 140 | 18 | 0 |
| 2 | $H_2SO_4$ | 980 | 155 | 18 | 0 |
| 3 | $H_3CC_6H_4SO_3H$, $H_2O$ | 690 | 120 | 18 | 0 |
| 4 | $CCl_3COOH$ | 330 | 150 | 18 | 0 |
| 5 | $CH_3SO_3H$ | 385 | 145 | 18 | 0 |
| 6 | $CF_3COOH$ | 460 | 110 | 10 | 0 |
| $7_1$ | $HClO_4$ in $(CH_3CO)_2O$ | 400 | 140 | 16 | 7 |
| $7_2$ | $HClO_4$ in $(CH_3CO)_2O$ | 5000 | 140 | 20 | 30 |
| 8 | $CF_3SO_3H$ | 300 | 165 | 18 | 57 |
| 9 | $CF_3SO_3H$ | 4500 | 170 | 24 | 90 |

*RY of polymer: The polymer yield is measured as follows: precisely 2 g of product are added (handling under dry $N_2$ to a beaker which is heated to 175° C. for 2 h in a vacuum of 1.3 mbar. After cooling, the beaker is weighed, which enables the polymer yield to be measured.

It follows clearly from Table I that only $HClO_4$ and, to a greater extent, $CF_3SO_3H$ have a beneficial effect and cause the cyclosilazanes to polymerize. Then, in effect, Examples 1-6 are comparative examples.

EXAMPLES 10 and 11

The operating procedure in Example 1 is reproduced exactly except that the polymerization is carried out in a solvent medium and at various temperatures. The catalyst employed in $CF_3SO_3H$, at a concentration of 4,500 ppm. The results are shown in Table II.

TABLE II

| Ex. | Concentration of $D_3^N$ mole $kg^{-1}$ | Solvent | Temperature °C. | Reaction time (hours) | RY of polymer % |
|---|---|---|---|---|---|
| 10 | 3.0 | $CH_2Cl_2$ | 60 | 22 | 46 |
| 11 | 3.0 | $(C_6H_5)CH_3$ | 125 | 22 | 71 |

The polymerization takes place correctly in a solvent medium, but the yield drops when the operation is carried out at a lower temperature.

EXAMPLE 12

The ammonolysate of $(CH_3)_2ClSiSiCl(CH_3)_2$, prepared in accordance with the operating procedure described in Example 22, consists chiefly of the products:

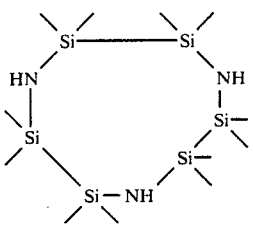

These organo(disilyl)silazanes can be polymerized under the same conditions as those described in Examples 1 to 11, and the results obtained are shown in Table III below:

TABLE III

| Ex. | Polymerization type | $CF_3SO_3H$ concentration (ppm) | Temperature °C. | Reaction time (hours) | RY of polymer (%) |
|---|---|---|---|---|---|
| 12 | bulk | 1,800 | 170 | 24 | 50 |

EXAMPLES 13, 14 and 15

For these examples, a coammonolysis of $(CH_3)_2SiCl_2$ and $CH_3SiCl_3$ is carried out in a solvent medium.

The following are added under dry nitrogen into a jacketed 3 liter reactor equipped with mechanical stirring, a gas entry tube and a condenser:

0.72 mole of $(CH_3)_2SiCl_2$ (92.5 g) and 0.72 mole of $CH_3SiCl_3$ (107.2 g), i.e., a theoretical mean coammonolysate functionality of approximatley 2.5 (Examples 13 and 14)

0.48 mole of $(CH_3)_2SiCl_2$ (61.9 g) and 0.96 mole of $CH_3SiCl_3$ (143.5 g), i.e., a theoretical mean coammonolysate functionality of approximately 2.67 (Example 15) in the presence of 1.1 liter of isopropyl ether for Example 13 and 15 or 1.1 liter of toluene dried over a molecular sieve for Example 14. The mixture is kept at ambient temperature (Examples 13 and 14) or is cooled to 3° C. and is kept at this temperature during the introduction of $NH_3$ gas (Example 15)—the reaction is slightly exothermic. The rate of addition of $NH_3$ is maintained at approximately 6 ml of gas per second and the addition is carried out over 6 h.

Large quantities of ammonium chloride are formed during the test, making the solution thick. At the end of the test, the $NH_4Cl$ formed is filtered off on sintered glass (10 um mean pore diameter). The precipitate is washed several times with dry solvent. The solution recovered is clear. The solvents are evaporated under reduced pressure (25 mbar at 70° C.) and the last traces of solvent are removed at 70° C. and 2 mbars.

The characteristics of the products are given in Table IV below.

EXAMPLES 16, 17 and 18

In these examples, the coammonolysates from Examples 13, 14 and 15 are treated with trifluoromethanesulphonic acid (4,5000 ppm) in bulk or in solution.

The operating conditions and the results are shown in Table V below.

TABLE IV

| Ex. | Ammonolysis T (°C.) | Solvent | $(CH_3)_2SiCl_2$ mole % | $CH_3SiCl_3$ mole % | % Yld. of coammonolysate | Viscosity mPa·s | % $D^{N}$* | % $T^{N}$* | TG Yld. % |
|---|---|---|---|---|---|---|---|---|---|
| 13 | 21° C. | Iso ether | 50 | 50 | 92.3 | 90 | 49 | 51 | 33 |
| 14 | 20° C. | Toluene | 50 | 50 | 85 | 600 | 46 | 54 | 31 |
| 15 | 3° C. | Iso ether | 33 | 67 | 89 | 5,300 | 33 | 67 | 48 |

*Determined by $^{29}$Si NMR

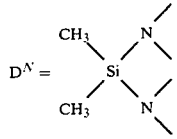

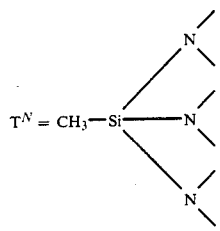

TABLE V

| Starting material + Example | Example | Polymerization time | Polymerization T (°C.) | Polymerization medium | Polymerization yld % | % of volatiles in the product obtained* | Viscosity mPa.s or appearance | $T^N/D^N$ ratio** | TGA yld (%) |
|---|---|---|---|---|---|---|---|---|---|
| 13 | | | | | | 47 | 90 | 1.04 | 33 |
| | 16₁ | 30 min. | 140 | bulk | 98 | 8 | Hard resin | 1.00 | 84 |
| | 16₂ | 1 hr. | 140 | bulk | 97 | 6 | Hard brittle material | 0.96 | 80 |
| 13 | 16₃ | 3 hr. 15 min. | 140 | bulk | 94 | 2 | Hard brittle material | 0.92 | 80 |
| | 16₄ | 21 hr. | 140 | bulk | 93 | 0 | Hard brittle material | 0.92 | 82.5 |
| 14 | | | | | | 47 | 600 | 1.17 | 31 |
| 14 | 17₁ | 6 hr. | 120 | *** | 95 | 2 | Solid | 1.17 | 85 |
| | 17₂ | 1 hr. | 140 | bulk | 97 | 5 | Solid | 1.20 | 81 |
| 15 | | | | | | 16 | 5,300 | 2.00 | 48 |
| 15 | 18 | 6 hr. | 120 | *** | 95 | 1 | Solid | 1.95 | 86 |

*Volatiles (30 min at 170° C. and 1.3 mbar)
**Determined by $^{29}$Si NMR
***40% in toluene It appears from these examples that the cationic rearrangement is fast and that it enables the proportion of volatiles to be greatly reduced by incorporating them into the whole lattice. Product viscosity rises rapidly and at ambient temperature the polymerized coammonolysate has the appearance of a hard, brittle solid which is soluble in the usual solvents such as toluene, isopropyl ether, xylene and the like.

The most important result is the large increase in the yield of ceramic as measured by TGA.

EXAMPLES 19, 20 and 21

In these examples, the products are obtained by devolatilization of the coammonolysates from Examples 13 and 14 or of the polymerized coammonolysate from Example 17₁.

The removal of volatiles is carried out for 30 min at 170° C. at a pressure of 1.3 mbar. The volatile products consist chiefly of cyclic or polycyclic compounds of low molecular mass, consisting of $T^N$ and $D^N$ units, but with a lower $T^N/D^N$ ratio than that of the average coammonolysate.

The results are shown in Table VI below:

TABLE VI

| Starting material + Example | Example | Devolatilization yld % | Appearance or viscosity mPa s | $T^N/D^N$ ratio | TGA yield % |
|---|---|---|---|---|---|
| 13 | | | 90 | 1.04 | 33 |
| 13 | 19 | 53 | Hard resin | 1.70 | 65 |
| 14 | | | 600 | 1.17 | 31 |
| 14 | 20 | 53 | Hard resin | 1.82 | 64 |
| 17₁ | | | Solid | 1.17 | 85 |
| 17₁ | 21 | 98 | Solid | 1.19 | 88 |

It can be seen that devolatilization makes it possible to obtain products which are more viscous than the starting coammonolysates and gives high TGA yields so far as the non-volatiles are concerned. In contrast to the polymerization, however, this result is obtained by a considerable change in the $T^N/D^N$ ratio of the product.

Similarly, the improvement in the TGA yield is only apparent, because the yield of ceramic in relation to the starting coammonolysate is unchanged.

Conversely, the process according to the invention enables the real yield of ceramic to be improved by incorporating the low molecular mass compounds into the whole lattice.

This is illustrated in Table VII, in which 100 g of the coammonolysate for Example 14 are treated by one of the following 4 routes:
a direct pyrolysis (a)
a devolatilization followed by a pyrolysis of the residue (b)
an acid treatment with $CF_3SO_3H$ followed by a pyrolysis (c)
an acid treatment with $CF_3SO_3H$ followed by a devolatilization and a pyrolysis (d)

TABLE VII

| Route | Weight used (g) | Acid treatment | Weight after acid treatment (g) | Devolatilization | Weight after devolatilization (g) | Weight of ceramic after pyrolysis (g) |
|---|---|---|---|---|---|---|
| a | 100 | NO | — | NO | — | 31 |
| b | 100 | NO | — | YES | 53 | 33.9 |
| c | 100 | YES | 96 | NO | — | 80.6 |
| d | 100 | YES | 96 | YES | 94 | 82.7 |

Table VII shows clearly the effect of the acid treatment of the coammonolysate on the quantity of ceramic formed and the equivalence existing between the devolatilization and the beginning of pyrolysis.

EXAMPLES 22 and 23

In Example 22 the product is obtained by a coammonolysis, in dry isopropyl ether (1,200 ml) at 20° C., of 0.375 mole of $(CH_3)_2SiCl_2$ (48.4 g) and 0.562 mole (128.3 g) of a mixture of a methylchlorodisilane of average formula:

$(CH_3)_{2.48}Si_2Cl_{3.52}$ consisting of
$CH_3Cl_2SiSiCH_3Cl_2$, i.e. $(CH_3)_2Si_2Cl_4$: 59 mole %
$CH_3Cl_2SiSi(CH_3)_2Cl$, i.e. $(CH_3)_3Si_2Cl_3$: 34 mole %
a mixture of $(CH_3)_2ClSiSiCH_3Cl_2$ and of $CH_3Cl_2SiSi(CH_3)_3$, i.e. $(CH_3)_4Si_2Cl_2$: 7 mole % i.e. a mean functionality of the coammonolysate of $f_m^N = 2.91$ The product, obtained in 90% yield, has a viscosity of 50,000 mPa.s.

In Example 23 the product is synthesized by an acid treatment of the coammonolysate from Example 22. The reaction is conducted in bulk at 130° C. for 3 hrs. in the presence of 4,500 ppm of $CF_3SO_3H$. The polymerization yield is 94% by weight. The product obtained is in the form of a hard, brittle solid which is soluble in the usual solvents.

The incorporation of disilane units in the product from Example 22 makes it possible to obtain a cross-linked material characterized by a markedly improved TGA yield of ceramic (Table VIII), compared to the coammonolysates of $CH_3SiCl_3$ on their own (Examples 13, 14 and 15). It appears that coammonolysates with a high functionality can be synthesized by means of chlorodisilanes without product gelling, which would lead to a drop in the coammonolysis yield.

After an acid treatment of the disilane coammonolysate, the TGA yield during pyrolysis is improved, rising from a TGA yield of 84% to 92% (product of Example 23).

TABLE VIII

| Starting coammonolysate Example | Polymerized product Example | Mean functionality | TGA yld % |
|---|---|---|---|
| 13 |  | 2.51 | 33 |
| 13 | 16$_2$ | 2.49 | 80 |
| 14 |  | 2.54 | 31 |
| 14 | 17$_1$ | 2.54 | 85 |
| 15 |  | 2.67 | 48 |
| 15 | 18 | 2.66 | 86 |
| 22 |  | 2.91 | 84 |
| 22 | 23 | 2.90 | 92 |

EXAMPLES 24, 25, 26, 27 and 28

In these examples, a copolymerization of an ammonolysate of $(CH_3)_2SiCl_2$ with an ammonolysate of $CH_3SiCl_3$ is carried out. The reaction is catalyzed by $CF_3SO_3H$ at a concentration of 1,000 ppm at 110° C. for 1 h. The results listed in Table IX below show that an increase in the $T^N/D^N$ ratio leads to an increase in the yield of polymer and generally to an increase in the TGA yield.

TABLE IX

| Example | $D^N$ mole % | $T^N$ mole % | Polymer RY % | TGA yld % | RY × TGA/100* % |
|---|---|---|---|---|---|
| 24 | 100 | 0 | 23 | 7 | 2 |
| 25 | 67 | 33 | 52 | 67 | 35 |
| 26 | 47 | 53 | 81 | 79 | 64 |
| 27 | 31 | 69 | 86 | 87 | 74 |
| 28 | 0 | 100 | 100 | 73 | 73 |

*The product RY × TGA/100 represents the weight of ceramic obtained per 100 g of starting silazane.

EXAMPLE 29

The example described below shows that it is possible to rearrange a polydimethylsilazane (obtained by a polymerization of $D_3^N$ by means of $CF_3SO_3H$ according to Example 9) with an ammonolysate of $CH_3SiCl_3$.

The results are shown in the Table X below:

TABLE X

| Example | $D^N$ mole % | $T^N$ mole % | Polymer RY % | TGA yld % | RY × TGA/100 % |
|---|---|---|---|---|---|
| 29 | 66 | 33 | 70 | 70 | 49 |

The rearrangement is catalysed by $CF_3SO_3H$ at a concentration of 1,275 ppm at 110° C. for 1 h. The weight of ceramic obtained per 100 g of silazane (49) is much higher than that obtained (2) in the case of polydimethylsilazane alone. See Example 24.

What is claimed is:

1. A process for treating polysilazane comprising the step of treating at least one polysilazane in homogeneous phase with a catalytically effective quantity of an acid catalyst selected from the group consisting of $HClO_4$ AND $CF_3SO_3H$ for a time sufficient to give rise to a polymerization and/or copolymerization and/or a rearrangement of said polysilazane.

2. A process as recited in claim 1, wherein said polysilazane is an organopolysilazane wherein organic radicals are bonded to silicon atoms of said polysilazane, said organic radicals being selected from the group consisting of saturated hydrocarbon radicals and aromatic hydrocarbon radicals.

3. A process as recited in claim 2, wherein said polysilazane is free from any hydrogen atom bonded directly to a silicon atom.

4. A process as recited in claim 2, wherein said organic radicals are selected from the group consisting of linear or branched alkyl radicals containing from 1 to 12 carbon atoms, cycloalkyl radicals containing from 5 to 7 carbon atoms, aryl radicals, and arylalkyl or alkylaryl radicals in which linear or branched alkyl portions contain from 1 to 6 carbon atoms.

5. A process as recited in claim 4, wherein said linear or branched alkyl radicals are halogenated.

6. A process as recited in claim 4, wherein said aryl radical is phenyl or naphthyl.

7. A process as recited in claim 2, wherein said treatment step is carried out in solution in the presence of an organic solvent.

8. A process as recited in claim 2, wherein said acid calayst is present at concentrations ranging from about 1 ppm to about 10,000 ppm relative to the weight of said polysilazane.

9. A process as recited in claim 8, wherein said acid catalyst is present at concentrations ranging from about 10 ppm to about 5,000 ppm relative to the weight of said polysilazane.

10. A process as recited in claim 8, wherein said process is conducted at a temperature from about 20° C. to about 180° C.

11. A process as recited in claim 10, wherein said process is conducted at a temperature from about 120° C. to about 160° C.

12. A process as recited in claim 2, wherein said treatment step is carried out in bulk.

13. A process as recited in claim 2, wherein said process is conducted for a time ranging from about 30 minutes to about 30 hours.

14. A process as recited in claim 2, wherein a sufficient quantity of base is added to said polysilazane after treatment with said acid catalyst to neutralize said acid catalyst.

15. A process as recited in claim 2, wherein said treatment step is carried out at normal pressure, at greater than normal pressure or under a vacuum.

16. A process for producing a ceramic product comprising:
   (a) treating at least one polysilazane in homogeneous phase with a catalytically effective quantity of an acid catalyst selected from the group consisting of $HClO_4$ and $CF_3SO_3$ for a time sufficient to give rise to a polymerization and/or copolymerization and/or a rearrangement of said polysilazane; and
   (b) pyrolyzing said treated polysilazane.

17. A process as recited in claim 16, wherein said treated polysilazane is devolatilized before being pyrolyzed.

18. A process as recited in claim 16, wherein said polysilazane is an organopolysilazane wherein organic radicals are bonded to silicon atoms of said polysilazane, said organic radicals being selected from the group consisting of saturated hydrocarbon radicals and aromatic hydrocarbon radicals, wherein said polysilazane is free from any hydrogen atom bonded directly to a silicon atom.

19. The product produced by the process of claim 1.

20. The ceramic product produced by the process of claim 16.

21. A process as recited in claim 2, wherein said polysilazane possesses a $T^N/D^N$ ratio greater than about 1:2.

22. A process as recited in claim 16, wherein said polysilazane possesses a $T^N/D^N$ ratio greater than about 1:2.

* * * * *